(12) United States Patent
Griesmayr (10) Patent No.: US 9,492,966 B2
(45) Date of Patent: Nov. 15, 2016

(54) METHOD FOR EMBOSSING A TIP COVER OF A CIGARETTE TIP

(75) Inventor: Guenter Griesmayr, Wels (AT)

(73) Assignee: TANNPAPIER GmbH, Traun (AT)

( * ) Notice: Subject to any disclaimer, the term of this patent is extended or adjusted under 35 U.S.C. 154(b) by 937 days.

(21) Appl. No.: 13/510,082

(22) PCT Filed: May 4, 2010

(86) PCT No.: PCT/AT2010/000144
§ 371 (c)(1),
(2), (4) Date: Nov. 21, 2012

(87) PCT Pub. No.: WO2011/060459
PCT Pub. Date: May 26, 2011

(65) Prior Publication Data
US 2013/0093117 A1    Apr. 18, 2013

(30) Foreign Application Priority Data

Nov. 17, 2009 (AT) ................. A 1818/2009

(51) Int. Cl.
*B29C 59/04* (2006.01)
*B31F 1/07* (2006.01)

(52) U.S. Cl.
CPC ................. *B29C 59/04* (2013.01); *B31F 1/07* (2013.01); *B31F 2201/0746* (2013.01); *B31F 2201/0779* (2013.01); *B31F 2201/0797* (2013.01)

(58) Field of Classification Search
CPC .. B29C 59/04; B31F 1/07; B31F 2201/0715; B31F 2201/0746
See application file for complete search history.

(56) References Cited

U.S. PATENT DOCUMENTS

| 2,403,461 | A | * | 7/1946 | Samson | 8/486 |
| 2001/0042345 | A1 | * | 11/2001 | Franco et al. | 49/92.1 |
| 2004/0051948 | A1 | * | 3/2004 | Reed | 359/529 |
| 2005/0279147 | A1 | * | 12/2005 | Boegli | 72/196 |
| 2006/0198920 | A1 | | 9/2006 | Spirito et al. | |
| 2006/0236878 | A1 | * | 10/2006 | Natsume et al. | 101/6 |
| 2007/0289701 | A1 | | 12/2007 | Boegli | |

(Continued)

FOREIGN PATENT DOCUMENTS

| JP | 2000-334864 A | 12/2000 |
| JP | 2005-161774 A | 6/2005 |

(Continued)

OTHER PUBLICATIONS

International Search Report of PCT/AT2010/000144, date of mailing Oct. 4, 2010.

*Primary Examiner* — Alison L Hindenlang
(74) *Attorney, Agent, or Firm* — Collard & Roe, P.C.

(57) ABSTRACT

A device (1) for embossing a predetermined pattern onto at least one flat material (4) introduced between at least two printing rollers of said device, the movements of the embossing rollers being synchronized and said rollers (2, 3) also comprise at least two embossing tracks (5, 6), wherein the movements of the embossing rollers (2, 3) are synchronized with each other by synchronization means (7, 8) associated with different embossing tracks (5, 6), which mesh with each other and are distributed over the lateral surfaces of the embossing rollers (2, 3) or are electronically and/or electromechanically synchronized together, the different embossing tracks (5, 6) of the associated synchronization means (7, 8) of the same embossing roller (2, 3) being offset in relation to each other.

43 Claims, 7 Drawing Sheets

(56) References Cited

U.S. PATENT DOCUMENTS

2008/0116610 A1    5/2008   Boegli
2009/0050001 A1    2/2009   Boegli

FOREIGN PATENT DOCUMENTS

| | | |
|---|---|---|
| JP | 2006-240742 A | 9/2006 |
| JP | 2007-331394 A | 12/2007 |
| JP | 2008-126669 A | 6/2008 |
| JP | 2009-051214 A | 3/2009 |
| JP | 2009-120218 A | 6/2009 |
| JP | 2010-111003 | 5/2010 |
| WO | WO 2007/107167 | 9/2007 |
| WO | WO 2008/122589 | 10/2008 |

\* cited by examiner

METHOD FOR EMBOSSING A TIP COVER OF A CIGARETTE TIP

CROSS REFERENCE TO RELATED APPLICATIONS

This application is the National Stage of PCT/AT2010/000144 filed on May 4, 2010 which claims priority under 35 U.S.C. §119 of Austrian Application No. A 1818/2009 filed on Nov. 17, 2009, the disclosure of which is incorporated by reference. The international application under PCT article 21(2) was not published in English.

The invention relates to a device for embossing a predeterminable pattern onto at least one flat material introduced between at least two embossing rollers of the device, the movements of the embossing rollers being synchronized with one another and the embossing rollers also having at least two embossing tracks.

Furthermore, the invention relates to a device for embossing a predeterminable pattern onto a flat material introduced between at least two embossing rollers of the device, the movements of the embossing rollers being synchronized with one another and the embossing rollers having one embossing track.

The invention also relates to a method for embossing a tip cover of a cigarette tip.

In addition, the invention relates to an embossing roller, the embossing roller having embossing structures formed by raised, in particular truncated pyramid-like points, which are arranged on at least one first and at least one second radially circumferential surface section.

The term "tip cover" is defined in this document to mean a "tip cover paper", but the term "tip cover" is used to express that the material used need not always be paper, and thus the "tip cover paper" can be made from any other suitable material, for example a plastic foil, cellophane etc.

The term "embossing track" is defined in this document to mean the surface section of a casing surface of an embossing cylinder, by means of which a web of material can be embossed. A single track can be embossed by a single track embossing cylinder, whereas with a twin-track embossing cylinder two material webs running next to one another can be embossed at the same time. A single track embossing cylinder can thus differ with respect to its width and the number and arrangement of the embossing structures, with which a pattern is embossed onto the material web.

A device of the aforementioned kind is known for example from WO 08/122,589. In the known device two embossing rollers held rigidly in a frame are synchronized by gears arranged laterally on the embossing rollers. The disadvantage of this known embodiment is mainly that because of the type of synchronization of the roller movements owing to the structure it is necessary to have a fixed distance between the rollers, whereby if the thickness of the material guided between the rollers varies problems may occur with the embossing process.

Therefore, the objective of the invention is to synchronize the embossing rollers such that reliable embossing is possible even with a varying thickness of the material to be embossed.

This objective is achieved according to the invention with a device of the aforementioned kind which comprises two embossing tracks, in that the movements of the embossing rollers are synchronized with one another by synchronization means which engage with one another and are distributed over the casing surfaces of the embossing rollers and are assigned to different embossing tracks or are synchronized electronically and/or electromechanically, wherein the synchronization means of the same embossing roller assigned to different embossing tracks are arranged to be offset relative to one another.

The aforementioned objective can also be achieved according to the invention with a device of the aforementioned kind which has an embossing track, in that the movements of the two embossing rollers are synchronized with one another by synchronization means engaging with one another and distributed over the casing surfaces of the embossing rollers, wherein the synchronization means of a first radially circumferential surface section are arranged to be offset relative to synchronization means of a second radially circumferential surface section of the same embossing roller.

The solution according to the invention makes it possible to balance out variations in the thickness of the material guided between the embossing rollers and at the time maintain the synchronization of the movements of the embossing rollers.

According to a preferred variant of the invention the synchronization means of the at least two embossing rollers can be raised points distributed over the casing surfaces of the embossing roller, wherein the casing surfaces of the embossing rollers are designed to be congruent with one another in the region of the synchronization means, and the raised points of at least one first radially circumferential surface section can be arranged to be offset relative to the raised points of at least one second surface section of the same embossing roller. This variant of the invention has the advantage that by means of the offset arrangement of the synchronization means relative to one another it can be ensured that regardless of the relative position of the rollers to one another a number of synchronization means of a first embossing roller can always be in full engagement with a number of synchronization means of a second embossing roller and thus a very reliable synchronization of the rollers can be achieved.

In an advantageous embodiment of the invention the raised points of the first surface section and the second surface section are arranged in rows, the rows of the first and the second surface section are offset relative to one another, whereby in the line of vision of a direction parallel to the longitudinal axis a row of the second surface section ends up between two rows of the first surface section. In this way it can be ensured that part of the synchronization means of the embossing rollers is in full engagement when the engagement between another part of the synchronization means is minimal. Therefore, in all positions of the rollers to one another the synchronization of the roller movements is ensured.

A very good engagement of the synchronization means of the two rollers with one another can be ensured by designing the raised points in the form of teeth.

The mutual engagement of the teeth with one another can be optimized in that the teeth are designed to be in the form of truncated pyramids.

In one variant of the invention, which is characterized by being simple to produce, the synchronization means of an embossing roller assigned to different embossing tracks are designed to be similar.

Good synchronization can be achieved for example in that synchronization means are arranged on the surfaces of the embossing rollers in parallel rows.

In order to apply a logo at least one first embossing roller can have at least one embossing/perforation structure, in particular for embossing or perforating at least one image or at least one graphic character, and at least one second embossing roller at the point corresponding to the embossing structure can be provided with a mating printing surface.

To ensure the reliable application of an image or graphic character, for example a logo, the embossing structure can be applied onto a suitable, smoothed surface layer.

With regard to the use of material with varying thickness it is also an advantage if the at least two embossing rollers can be pressed against one another flexibly.

In order to monitor the roller movements the device can comprise sensors for determining the relative position of the embossing rollers to one another.

According to an advantageous variant of the invention the sensors can be designed in the form of rotary angle sensors. The use of rotary angle sensors makes it possible to define rapidly and reliably a relative angle between the rotating embossing rollers.

According to a preferred embodiment of the invention one of the embossing rollers can be driven by a motor and the second embossing roller can be driven by the synchronization means arranged on the embossing surfaces and engaging with one another.

According to a different variant of the invention characterized by having a simple structure, as in this case synchronization means do not necessarily need to be provided on the surfaces of the embossing rollers, each embossing roller can be driven by its own motor.

Preferably, the device in the embodiment of the invention described in the last paragraph can comprise a control connected to the sensors and the motors of the embossing rollers, which control is set up to change the speed of the embossing rollers to compensate for a difference between a reference relative position and a measured relative position on the basis of data transmitted thereto by the sensors.

In a further advantageous variant which is characterized by its simple structure, the device comprises an electric motor which simultaneously drives a drive shaft for each embossing roller at the same speed, wherein the embossing rollers are arranged to be parallel to one another.

A simple synchronization of the movements of the two embossing rollers can be achieved in that on a first of the drive shafts a first embossing roller is arranged and the second drive shaft drives a shaft parallel to the first drive shaft by means of at least one force coupling member on which shaft a second embossing roller is arranged.

A further structural simplification and a reliable synchronization of the embossing rollers can be achieved in that the first and the second drive shaft are designed to be in one piece with one another.

Thermoplastic deformations of the material to be embossed can be achieved in that the device has a radiation and/or heat source acting on the material to be embossed.

In order to enable the precise positioning of the structure to be embossed on the material the device can comprise an optical measuring device arranged downstream of the embossing rollers for detecting the position of a pattern produced by means of the embossing/perforation structure on the material to be embossed.

According to one variant of the invention which is characterized by its high degree of reliability, the optical measuring device can be an image recognition unit.

Furthermore, the device can be set up to compensate for a deviation between a detected position and a reference position of the pattern produced.

In a further advantageous variant of the invention which enables precise embossing in coordination with an imprint applied onto the material, the device is set up to determine prior to the embossing of the material a distance between at least two consecutive imprints on the material to be embossed and in the case of a deviation of this distance from a reference distance is set up to change the longitudinal extension of the material according to the determined deviation.

In a preferred variant of the invention the device comprises at least one image recognition unit arranged upstream of the embossing rollers for determining the position of at least one imprint applied onto the material to be embossed and at least one braking device arranged upstream of the embossing rollers acting on the material to be embossed for changing the longitudinal tension of the material to be embossed, wherein at least one control is provided which is set up to activate the braking device in case of a deviation of the position of the imprint from a reference position, so that the longitudinal tension of the material to be embossed is changed according to a force exerted by the braking device on its surface, wherein the force exerted by the braking device on the material to be embossed is dependent on the determined deviation in position. By using a braking device the web tension of the material to be embossed can be changed in a simple manner.

Advantageously the braking device can comprise two braking rollers between which the material to be embossed is guided. The use of braking rollers is very suitable for controlling the tension of the material, as the latter can be adjusted so that the rotation of the rollers is always possible without reaching the tearing limit of the material.

The longitudinal tension of a web of material to be embossed can be controlled very effectively in that the pressure force of the two braking rollers can be adjusted relative to one another.

In order to identify the position of an imprint on the material to be embossed, the image recognition device can be set up to compare saved characteristic features of the imprint or an image of the imprint with a recorded image or characteristic features of an imprint printed on the material to be embossed.

To determine the correct positioning of imprints on the surface of the material to be embossed the control can be set up to determine the distance between at least two consecutive imprints applied onto the material to be embossed and to check whether this distance corresponds to a reference distance.

In an advantageous embodiment of the invention which enables an optimum correction of the position of an imprint, the control can also be set up in case of a deviation of the reference distance from the determined distance to determine the amount of force to be exerted on the material to be embossed which is necessary to compensate for this deviation.

In a particularly advantageous variant of the invention, which is characterized in that even with a varying material thickness and thus varying extension behavior of the material a continually good result can be achieved, the device is set up to check on the basis of the optical measuring device arranged downstream of the embossing rollers whether the position of the at least one imprinted pattern corresponds to the at least one imprint of a reference position, wherein the control connected to the braking device is set up to control the force exerted by the braking device on the material to be embossed as a function of the measurement result of the position check of the optical measuring device connected downstream of the embossing rollers, in order to compensate for any deviation of the reference positions of the imprint and embossed pattern relative to one another.

The device according to the invention can be used in a particularly advantageous manner in a method for embossing a tip cover material of a cigarette.

In an inexpensive variant of the invention paper is used as the tip cover material. In principle, the tip cover can also be made from any other suitable material, for example plastic foil or laminate, for example aluminum laminated paper, cellophane, steamed materials, fabrics, etc.

Thus for example in one embodiment of the invention a foil is used as the tip cover material, in particular a material coated with a heat embossing foil, which can be heated prior to embossing.

According to the method of the invention prior to embossing the material a distance between at least two consecutive imprints can be determined on the material to be embossed and in the case of a deviation of this distance from a reference distance the longitudinal extension of the material can be changed according to the determined deviation.

According to an advantageous variant of the invention with at least one image recognition unit arranged upstream of the embossing rollers the position of at least one imprint applied onto the tip cover material to be embossed is determined, and by means of at least one braking device upstream of the embossing rollers and acting on the tip cover material to be embossed the longitudinal tension of the tip cover material to be embossed is changed, whereby at least one control can be provided, which in case of a deviation in position of the imprint from a reference position activates the braking device, so that the longitudinal tension of the tip cover material to be embossed is changed according to a force exerted by the braking device on the tip cover material to be embossed, whereby the force exerted by the braking device on the tip cover material to be embossed is dependent on the determined deviation in position.

In a particularly advantageous variant of the invention the tip cover material to be embossed is pretensioned. The pretensioning of the material has the effect that the longitudinal extension of the tip cover material can be reduced by reducing the braking force. Thus the length can be corrected both in and against the conveying direction of the web of the material to be embossed.

According to a preferred variant of the method according to the invention saved characteristic features of the imprint or a saved image of the imprint saved in the image recognition unit can be compared with a recorded image or characteristic features of an imprint applied onto the material to be embossed.

According to an advantageous development of the method of the invention by means of the control the distance between at least two consecutive imprints applied onto the material to be embossed can be determined and it can be checked whether this distance corresponds with a reference distance.

If there is difference between the reference distance and the determined distance the force necessary for compensating the deviation and to be exerted on the material to be embossed by means of the braking device can be defined by the control.

It is also possible that the image recognition unit downstream of the embossing rollers can be used to check whether a position of the at least one imprinted pattern in relation to the at least one imprint corresponds to a reference position, wherein the force exerted by the braking device on the material to be embossed is controlled as a function of the result of the position checking of the image recognition unit downstream of the embossing rollers, in order to compensate for any deviation of the reference position from the imprint and embossed pattern.

The aforementioned problem can be solved by means of an embossing roller of the aforementioned kind, in that the embossing structures of the at least one first and the at least one second radially circumferential surface section of the embossing roller are arranged to be offset to one another laterally and in radially circumferential direction. The term "surface sections" is in this case defined as areas which rotate perpendicular to the longitudinal direction or height of the roller as viewed next to one another and parallel to one another on the cylinder casing surface of the roller and have embossing structures formed by raised points, in particular truncated pyramid forms. An embossing structure is defined as a connected amount of raised points of a roller necessary to emboss an individual logo. A plurality of embossing structures are arranged behind one another on the same surface section in the rotational direction of the rollers, which in cooperation with corresponding mating structures, in particular truncated pyramid structures, preferably emboss similar logos.

The invention as well as all of the additional advantages is explained in more detail in the following with reference to several non-restrictive exemplary embodiments, which are shown in the drawings. In a schematic view.

First of all, it should be noted that in the variously described exemplary embodiments the same parts have been given the same reference numerals and the same component names, wherein the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

The figures are described in connection with one another and comprehensively.

Figure 1:
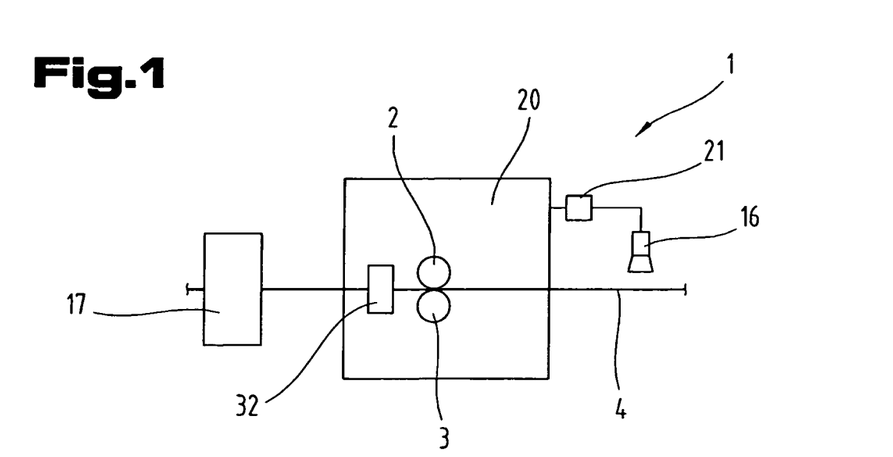
FIG. 1 shows a device according to the invention.

According to FIG. 1 a device 1 according to the invention can comprise two or more embossing rollers 2 and 3, between which a flat material 4 is guided for embossing a pattern. The movements of the embossing rollers 2 and 3 are synchronized with one another according to the invention. The synchronization of the embossing rollers 2 and 3 can be performed by means of synchronization means distributed over the casing surfaces of the embossing rollers 2 and 3 or electronically and/or electromechanically.

Figure 2:
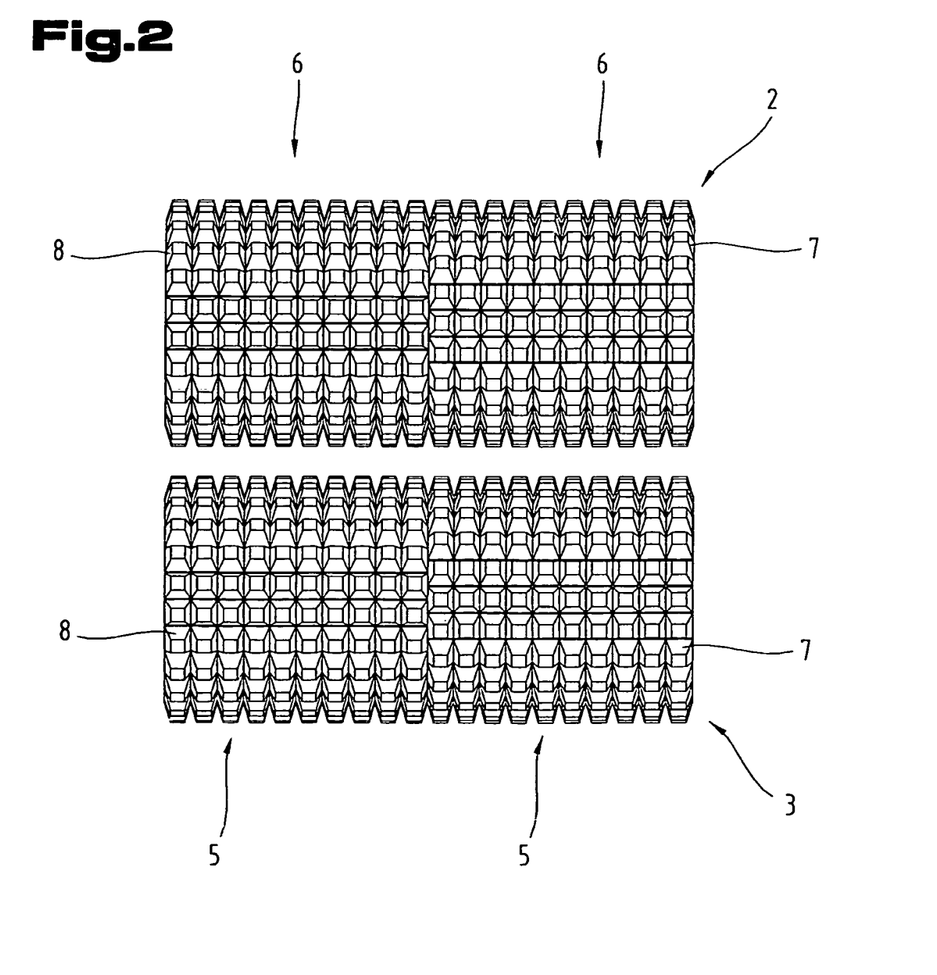
FIG. 2 shows a front view of two embossing rollers of a first variant of a device according to the invention.

As shown in FIG. 2, the embossing rollers 2 and 3 can comprise two or more embossing tracks 5 and 6. With an embossing track 5 or 6 one web of material 4 can be embossed respectively. If the synchronization is performed by means of synchronization means 7, 8 arranged on the casing surfaces of the embossing rollers 2 and 3, the latter are assigned to the different embossing tracks 5, 6. The synchronization means 7 and 8 of the same embossing roller 2 assigned to different embossing tracks 5, 6 are arranged to be offset to one another according to the invention. The term "offset" is defined in this document to be in or against the direction of rotation of the embossing roller under consideration.

The synchronization means 7, 8 of the embossing rollers can be raised points distributed over the casing surfaces of the embossing rollers 2, 3, and with the exception of surface sections which comprise embossing structures or counterparts explained in more detail below, cover essentially the casing surfaces of the respectively assigned embossing rollers 2, 3. In the region of the synchronization means 7, 8 the casing surfaces of the embossing rollers 2, 3 are designed to be congruent with one another, as shown for example in FIG. 3. The synchronization means 7, 8 of the same embossing rollers 2, 3 or the synchronization means 7, 8 of all embossing rollers 2, 3 can also be designed to be similar.

Furthermore, the raised points of a first radially circumferential surface section are arranged to be offset relative to the raised points of a second surface section of the same embossing roller. According to the variant of the invention shown in FIGS. 2 and 4 said surface sections correspond to the embossing tracks 6 and 5.

Figure 5:
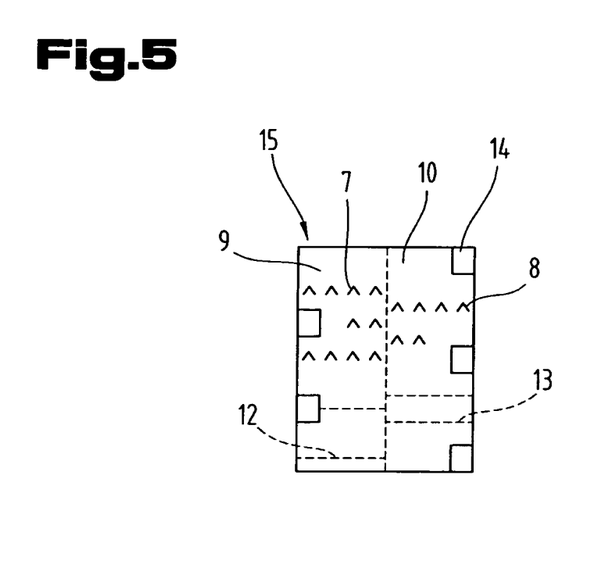
FIG. 5 shows a plan view of a single-track embossing roller according to a second variant of a device according to the invention.

According to FIG. 5 however with a single track embodiment of the embossing rollers the latter can have radially rotating surface sections 9, 10, the synchronization means 7 and 8 of which are arranged to be offset relative to one another.

Figure 3:
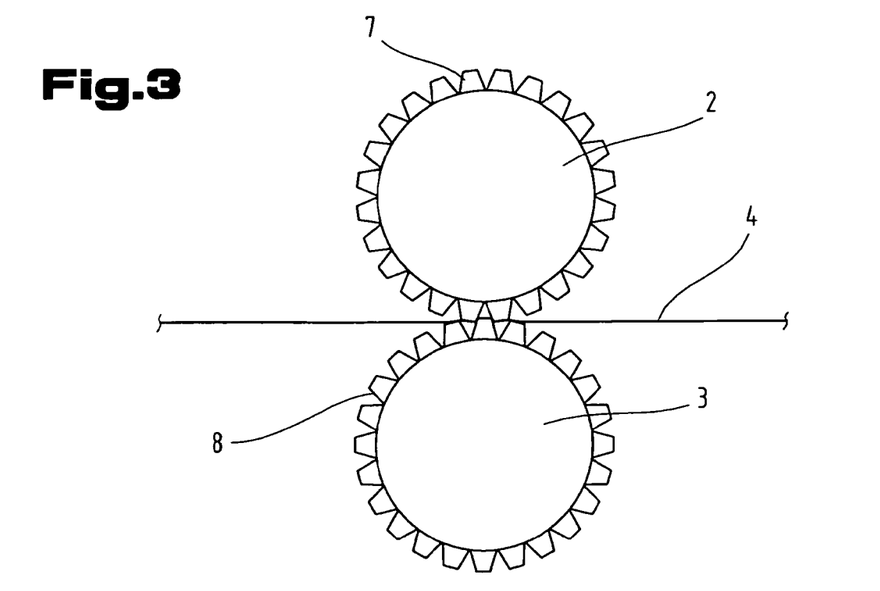
FIG. 3 shows a side view of the embossing rollers of FIG. 1
Figure 4:
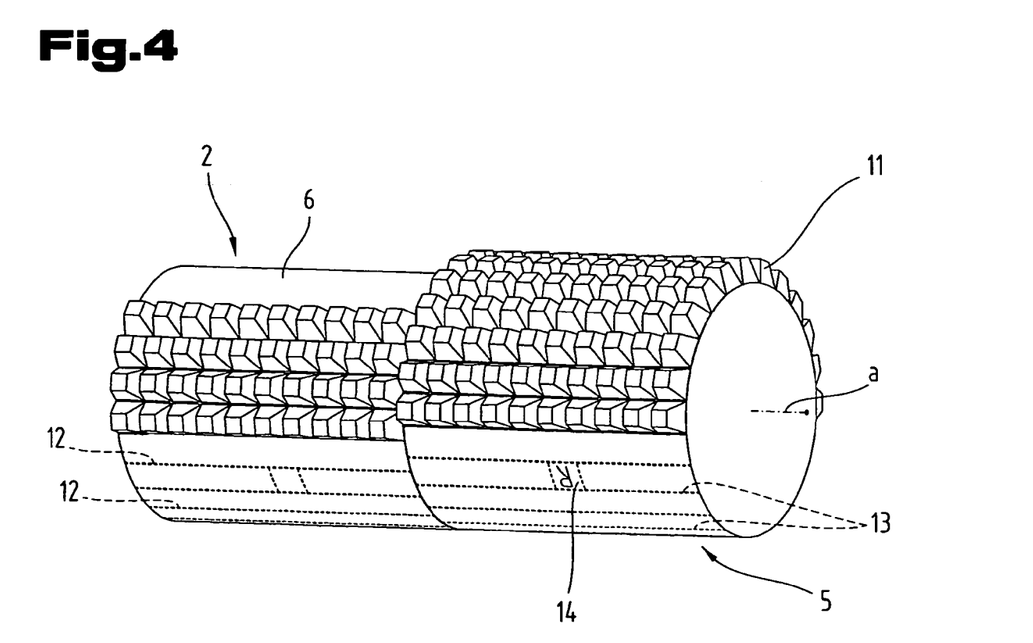
FIG. 4 shows a perspective view of one of the embossing rollers of FIG. 1.

As shown in FIGS. 3 and 4, the raised points or synchronization means 7, 8 can be designed as teeth 11 with a truncated pyramid form, wherein other tooth shapes are also possible which ensure reliable meshing, for example a truncated cone tooth shape. In the shown case of truncated pyramid-shaped teeth 11 during the meshing of the teeth of the two embossing rollers one tooth 11 of the first roller 2 is always in contact with four teeth 11 of the second roller 3 or is surrounded by the latter.

As also shown in FIGS. 2, 4 and 5, the synchronization means 7, 8 can be arranged on the surfaces of the embossing rollers 2 and 3 in parallel rows. Furthermore, the rows of the first and the second surface section denoted in FIG. 5 by 9 and 10 or the embossing tracks 5, 6 can be offset relative to one another. In the line of vision of a direction parallel to the longitudinal axis in this case a row of the second surface section 10 or the second embossing track 5 and vice versa ends up between two rows of the first surface section 9 or embossing track 6. This means for example in the case of the embodiment shown in FIG. 4, that the rows 12 formed by the truncated tips of the pyramids of the first embossing track 6 and running parallel to the longitudinal axis of the embossing roller 2 lie in the extension of a valley 13 lying between the pyramids, and also running parallel to the longitudinal axis (a) of the embossing roller 2. The truncated tips of the pyramids are indicated by dashed lines in FIG. 4, whereas the valleys in between are shown as free surfaces.

By means of the arrangement of rows or teeth 11 mentioned in the previous paragraph a particularly good synchronization of the embossing rollers 2 or 3 can be achieved over their casing surfaces, as part of the pyramid-shaped teeth 11 are always in engagement with one another. At this point it should be mentioned that the teeth 11 of the embossing rollers 2 and 3 can be designed to be similar. However, it is also possible for the teeth 11 of the embossing rollers 2 to be designed to be shorter or longer than the teeth 11 of the embossing roller 3.

In the embodiments of the invention shown in FIGS. 1 to 5 one of the embossing rollers 2, 3 can be fixed and driven, whilst the other one can be mounted to rotate freely on an axis and can be pressed by spring force, pneumatically or in another manner, flexibly with adjustable pressure against the driven embossing roller 2 or 3. The second embossing roller 2 or 3 is driven by the meshing synchronization means 7, 8 arranged on the casing surfaces.

In order to emboss a character or image etc., hereinafter referred to as a "logo", onto the flat material, one of the embossing rollers can comprise at least one corresponding embossing/perforation structure 14. The term logo, as used here, thus comprises all characters, decorative elements, image elements etc. embossed by the embossing/perforation structures 14.

The embossing/perforation structure 14 can be applied to a suitably smoothed surface layer of the embossing roller 2. The second of the embossing rollers 3 can be provided on the point corresponding to the embossing structure 14 with a mating printing surface.

The embossing structure 14 corresponding to the logo can be reflected twice relative to a normal view of the logo on one of the embossing rollers 2, 3. The reflection can in this case be bout a vertical axis and about a horizontal axis. In FIG. 4 the embossing structure 14 represents a twice reflected "R". This embodiment of the invention is particularly suitable for embossing from above, i.e. for the arrangement of the embossing structure 14 on the upper embossing roller 2 in FIG. 3. The same applies of course to the embodiments of the invention shown in FIGS. 5 and 6 with a plurality of laterally displaced embossing structures 14, which can also be reflected twice.

Figure 11:
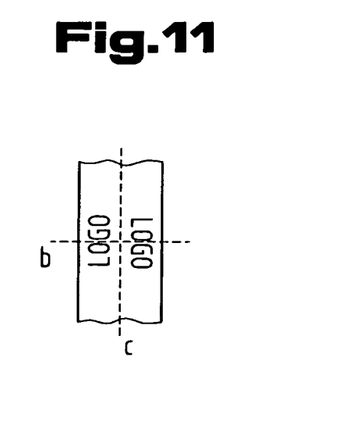
FIG. 11 shows a view of a reflection of a structure to be embossed.

FIG. 11 shows a further example to illustrate how the aforementioned reflection is to be understood. In this case the logo to be embossed, in the present case "LOGO", is firstly reflected about geometric axis (b) and then about geometric axis (c).

Figure 6:
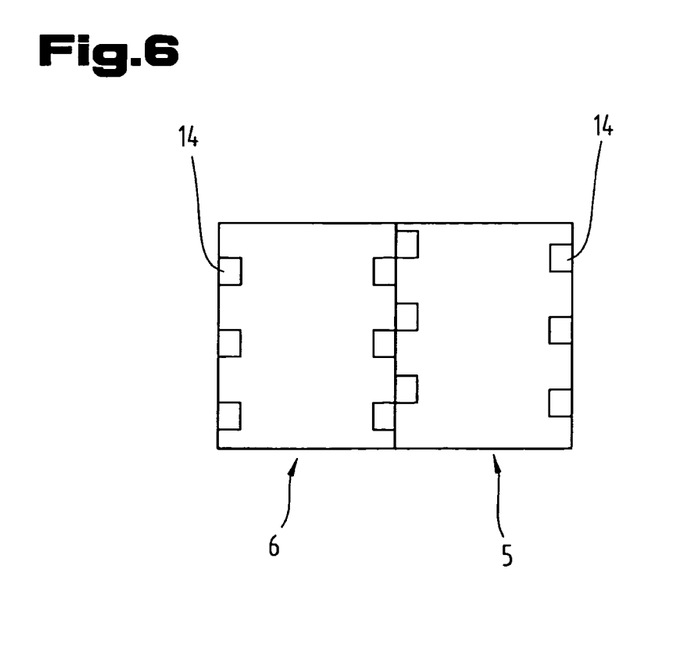
FIG. 6 shows a plan view of a twin-track embossing roller according to a third variant of the device according to the invention.

According to FIG. 5 a single track embossing roller 15 can have a plurality of embossing/perforation structures 14, which are arranged to be offset relative to one another laterally and in the radially rotating direction of the embossing roller 15. Although FIG. 5 relates to an embossing roller 15 with only one embossing track, it is of course also possible that a twin or multiple-tracked embossing roller, for example the embossing roller 2 shown in FIG. 4, also has one or more embossing tracks 5, 6 with embossing structures 14 offset laterally and in radially circumferential direction. FIG. 6 shows such an embossing roller with two embossing tracks 5, 6 and offset embossing structures 14.

Figure 7:
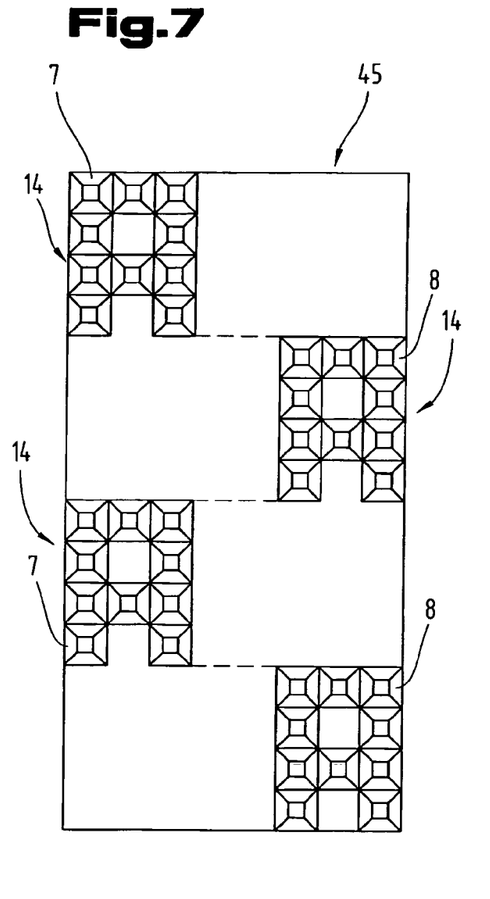
FIG. 7 shows a plan view of a twin-track embossing roller, wherein the embossing structures are formed by the synchronization means.

As shown in FIG. 7 the embossing structures 14 of an embossing roller 45 can be formed by the synchronization means 7 and 8, so that on the relevant embossing roller 45 synchronization means 7, 8 are only arranged in the area of the logo to be printed.

Figure 8:
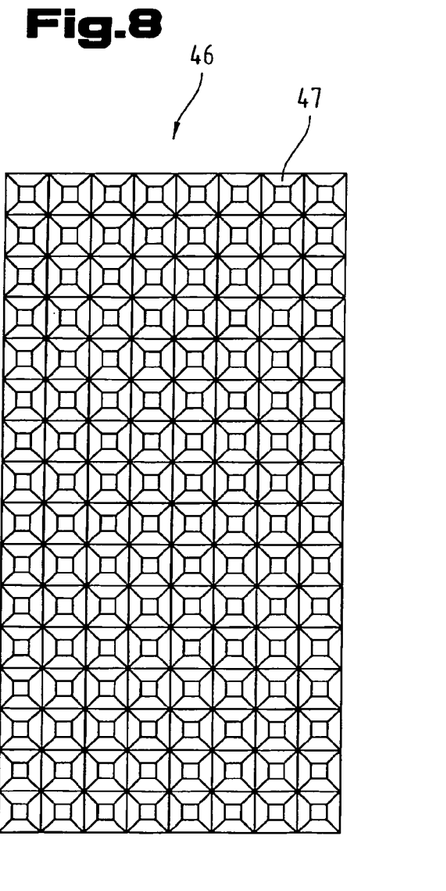
FIG. 8 shows a plan view of a drive roller for driving the embossing roller of FIG. 7.

As shown in FIG. 8 a drive roller 46 with the synchronization means 7, 8 can have similar truncated pyramid shaped synchronization means 47 which are distributed evenly over the surface of the drive roller 46.

Figure 9:
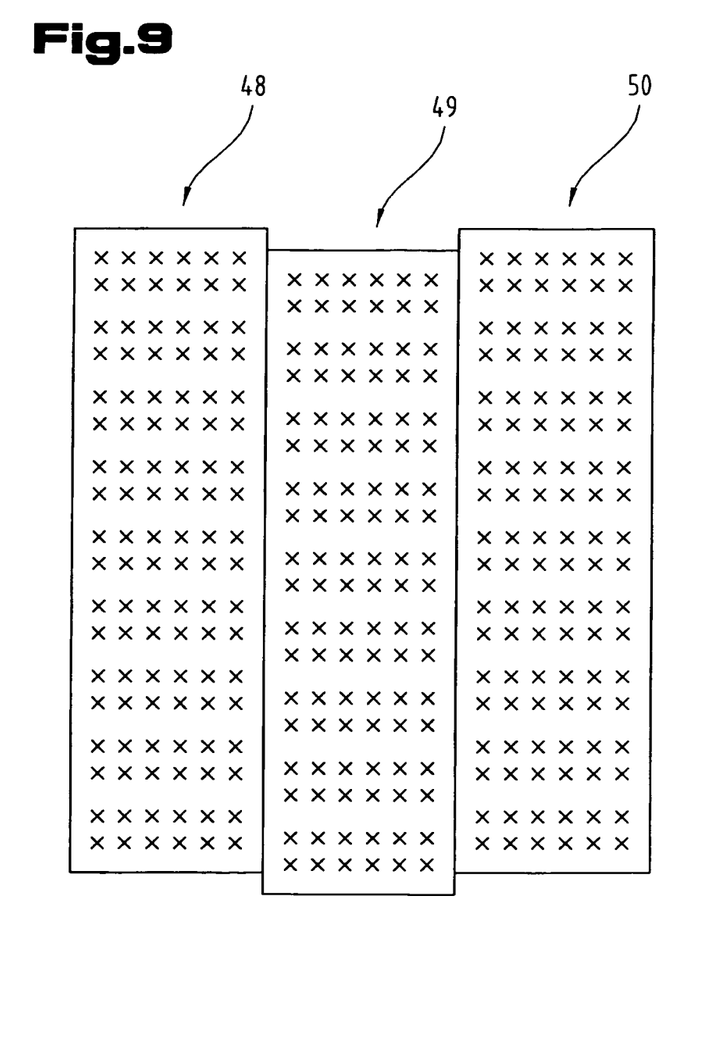
FIG. 9 shows a plan view of a three-track embossing design.

FIG. 9 clarifies the solution according to the invention by way of three offset embossing tracks 48, 49, 50. The embossing structures 14 formed by the synchronization means are offset relative to one another, thereby ensuring a permanent engagement of the synchronization means 47 of the drive rollers 46.

Figure 10:
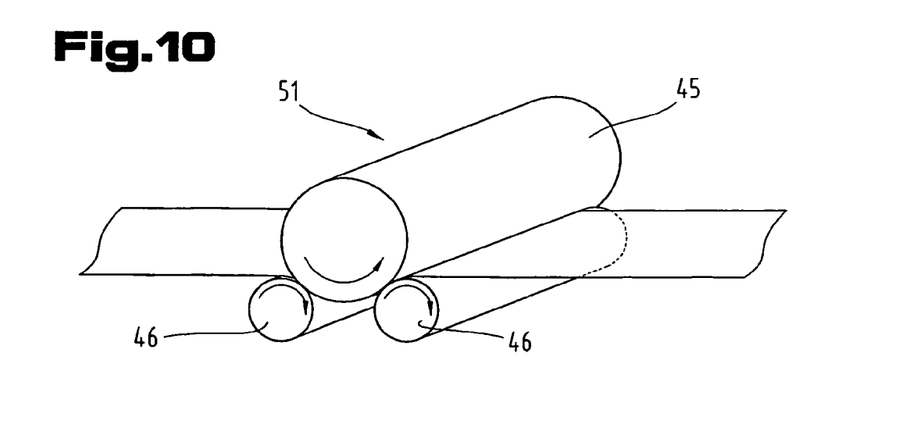
FIG. 10 shows a perspective view of an embossing station comprising a drive roller and two embossing rollers.

According to FIG. 10 an embossing station 51 according to the invention can comprise a roller 45 with offset embossing structures and two rollers 46 provided with truncated pyramids 47 over the whole surface.

By offsetting the embossing structures 14 the permanent engagement of the synchronization means 7, 8, 47 of the embossing rollers 45 and the drive roller 46 can be achieved.

As also shown in FIG. 1, the device 1 according to the invention can also comprise an image recognition unit 16 for detecting the position of a pattern produced by the embossing/perforation structure 14 on the material 4 to be embossed.

Figure 12:
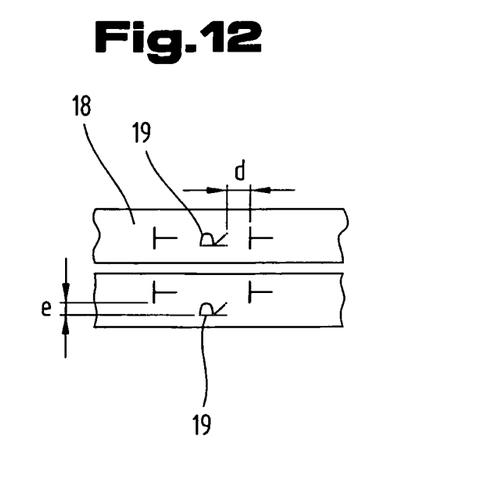
FIG. 12 shows a plan view of sections of two tracks of a tip cover material embossed by means of the twin-track embossing roller of FIG. 4.

By means of this image recognition unit 16 for example a longitudinal distance (d) shown in FIG. 12 and a lateral distance (e) between an imprint 18 printed by a printing device 17 and the logo 19 embossed by the embossing rollers 2, 3 can be determined. The term "imprint" is defined in this document as all visible changes to the material 4 regardless of the manner of application, including a character, graphic or numerical elements, decorative elements, image elements, etc. In particular, the term "imprint", as defined here, also includes embossing or perforations of the material 4 in addition to graphic images. In the case of embossing or perforations, which are applied prior to the embossing of the pattern 19 onto the material 4, instead of the printing device 17 a suitable embossing/perforation device can be provided. Of course, the application of imprints 18 does not need to take place immediately prior to embossing the pattern 19. Thus for example the material 4 could be provided with the imprints 18 in different place and then, possibly after temporary storage, brought to the site of the device 1 according to the invention and processed.

If there is a deviation between the determined position of the embossed logo 19 from the reference position this can be corrected accordingly.

A deviation in length from the reference value can be compensated for example by an extension of the material 4 to be embossed. Another way of correcting a deviation in length would be to lengthen or shorten the running length of the material 4 between the printing device 17 and the embossing rollers 2 and 3. For this the printing device 17 or an embossing station 20 containing the embossing rollers 2 and 3 can be moved accordingly. This can be controlled automatically. Thus the printing device and/or the embossing station 20 can be moved accordingly by means of a control 21 in connection with stationary drives. To facilitate the movement the printing device 17 and/or the embossing station 20 can be mounted on rollers or wheels. To improve the guiding the printing device 17 or the embossing station 20 can also run on rails.

A deviation of the lateral distance (c) between the embossed logo 19 and the imprint 18 can be corrected for example by a lateral change in position of the embossing rollers 2, 3 or by a rotary frame, not shown here, connected upstream of the embossing rollers 2, 3.

Figure 13:
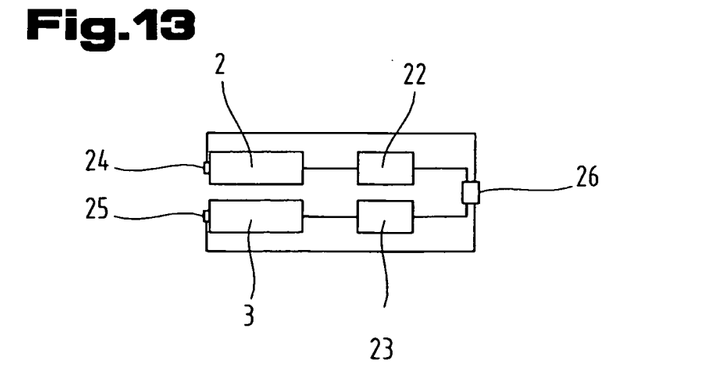
FIG. 13 shows a fourth variant of a device according to the invention.

According to the embodiment of the invention shown in FIG. 13 each embossing roller 2, 3 can be driven by its own motor 22, 23. In this case it is not absolutely necessary, that the synchronization takes place via the casing surfaces of the embossing rollers 2, 3 but this can also be performed by means of an electronic or electromechanical control.

The movements of the embossing rollers 2, 3 can be monitored by means of sensors 24, 25, whereby also the relative position of the embossing rollers 2, 3 to one another can be determined. The sensors 24, 25 can be designed for example as rotary angle sensors. Furthermore, the device can comprise a control 26 connected to the sensors 24, 25 and the motors 22, 23 of the embossing rollers 2, 3, which control is set up with reference to data transmitted thereto by the sensors 24, 25 to change the speed of the embossing rollers 2, 3 to compensate a difference between a reference relative position and a measured relative position. In this way the two embossing rollers 2, 3 can be synchronized in an electronically controlled manner.

Figure 14:
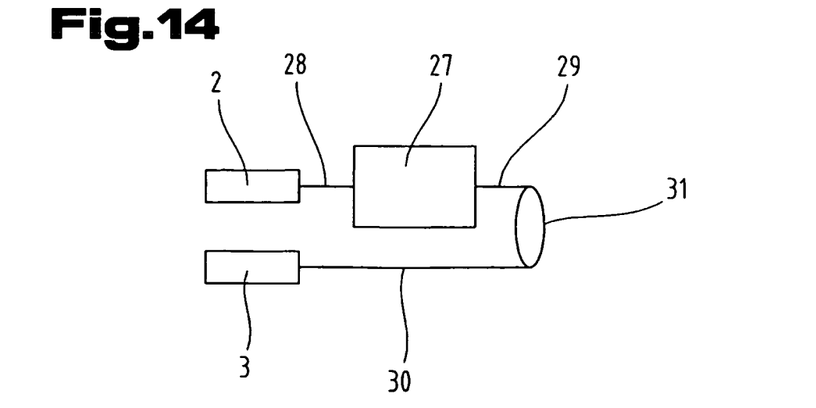
FIG. 14 shows a fifth variant of the device according to the invention.

As shown in FIG. 14, the device can comprise an electric motor 27, which drives a drive shaft 28, 29 for an embossing roller 2, 3 at the same speed, wherein the embossing rollers 2, 3 are arranged to be parallel to one another. In this embodiment of the invention the synchronization of the movements of the embossing rollers 2, 3 can be achieved by the electric motor 27 itself, which drives both embossing rollers 2, 3 at the same speed. In this way the embossing rollers 2, 3 preferably have the same cross sectional diameter or cross sectional circumference, in order to ensure the simple maintenance of the relative positions of the casing surfaces of the embossing rollers to one another.

Preferably, the first and the second drive shaft 28, 29 are designed to be in one piece with one another. By means of the one-piece design of the drive shafts 28, 29 in a simple manner the synchronization of the rotational movements of the drive shafts 28, 29 and then the embossing rollers 2, 3 can be achieved. Thus the first embossing roller 2 can be driven directly for example by the drive shaft 28, whereas the second embossing roller 3 can be driven by a shaft 30 parallel to the drive shaft 28. The drive shaft 29 can be connected by means of a force coupling member 31, for example a toothed belt etc., to the shaft 30.

Furthermore, in the variants of the invention shown in FIGS. 13 and 14 one of the embossing rollers 2, 3 can be fixed in position, whilst the other of the embossing rollers 2, 3 can be pushed flexibly with adjustable pressure against the first of the embossing rollers 2, 3.

Also in all of the aforementioned embodiments of the invention, the device according to the invention can comprise a radiation and/or heat source denoted in FIG. 1 by reference number 32 acting on the material 4 to be embossed, for example radiation heating or convection heating.

Figure 15:
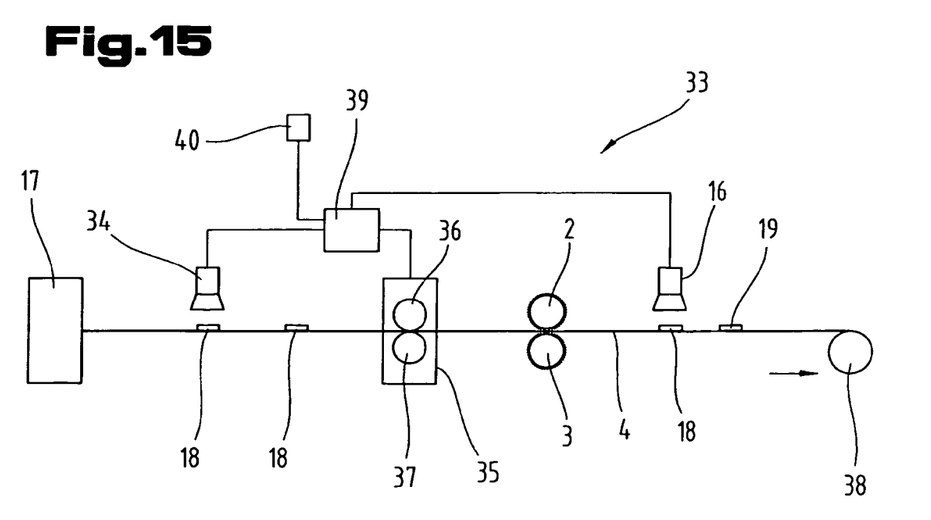
FIG. 15 shows a sixth variant of the device according to the invention.

As shown in FIG. 15, the device 33 according to the invention can comprise according to a further variant of invention a further image recognition unit 34 arranged upstream of the embossing rollers 2, 3 for detecting the position of an imprint 18 applied onto the material 4 to be embossed.

Furthermore, a braking device 35 upstream of the embossing rollers 2, 3 and acting on the material 4 to be embossed can be provided to change the longitudinal tension of the material 4 to be embossed. The braking device 35 can comprise two braking rollers 36, 37, between which the material 4 to be embossed is guided in conveying direction.

The braking rollers 36 and 37 can be mounted to be freely rotatable. Furthermore, one of the braking rollers 36, 37, e.g. braking roller 37, can be mounted on a fixed axis, whereas the other braking roller 36 can be pushed by means of spring force, pneumatically or in another way with adjustable pressure against the braking roller 37. In this case the axis of the braking roller 37 can be guided movably in a frame, not shown here, in the direction of the braking roller 36 and in opposite direction.

Instead of having two braking rollers 36, 37 it is also possible to have only one braking roller 36 or 37 pressing on a corresponding counter pressure surface. The material 4 can run between the braking roller and the counter pressure surface. The counter pressure surface can be formed for example by a curved surface section of a rod, the longitudinal axis of which can be arranged parallel to the rotational axis of the braking roller 36 or 37 rod. Thus the braking device 35 can comprise at least one braking roller 36, 37 cooperating with a counter pressure surface, wherein the material to be embossed is guided between the braking roller 36, 37 and the mating pressure surface.

Furthermore, instead of braking rollers 36, 37 clamping elements can be used, for example in the form of braking blocks that can be moved towards one another, between which the material can be guided. Alternatively to the use of two movable braking blocks also only one braking block could be provided which can be moved in the direction of a mating pressure surface. Thus the braking device 35 according to this variant of the invention could comprise at least one braking block, which can be moved against the mating pressure surface or against another braking block, wherein the material 4 is guided between the braking blocks or the at least one braking block and the counter pressure surface in conveying direction.

According to a further variant of the invention, if the material 4 to be embossed is wound onto a roll, a rolling device can be provided with a braking device. The braking device of the rolling device can be activated according to the desired web extension. In this case an additional braking device could be omitted. This embodiment is suitable mainly for a variant of the invention, in which the imprint 18 has already been applied onto the rolled up material 4.

In all of the variants of the invention a compensating roller or trackless web tension measuring roller can be used as a measuring element for the web tension.

The conveying direction is indicated in FIG. 15 by an arrow. The material 4 to be embossed is drawn by a pulling force acting in conveying direction in the direction of the embossing rollers. This pulling force can be produced for example by the embossing rollers 2 and 3 or also by a pulling device connected downstream of the embossing rollers 2, 3. The pulling device arranged possibly downstream of the embossing rollers 2, 3 can be designed for example as a driven winding roller 38, on which the material 4 can be wound after embossing.

The device 33 according to the invention can also comprise a control 39, for example a suitably programmed microprocessor or signal processor, which is set up to activate the braking device 35 if there is a deviation in position of the imprint 18 from a reference position. In this way the longitudinal tension of the material 4 to be embossed can be changed according to a force exerted by the braking device 35 on the material 4. In other words, the material 4 to be embossed is held back by the force exerted by the braking device 35 and stretched in longitudinal direction by the pulling force acting in conveying direction. The extension of the material 4 can thus be controlled at a constant pulling force by the adjustment of the force exerted by the braking device 35 on the material 4. A determined deviation in position can therefore be corrected by means of the braking device 35.

For this the control 35 can be set up, if the reference distance deviates from the determined distance, to determine the force necessary to compensate the deviation to be applied to the material 4 to be embossed by means of the braking device. This can be performed for example in that values or amounts for the force to be adjusted saved in memory 40 connected to the control 39 can be read in case of deviation from the control 39 and sent to the braking device 35. The value of the force to be set can be sent in analogue or digital form. Furthermore, instead of the value a signal proportional to this value can be sent to the braking device 35.

The values or amounts of the force to be exerted by the braking device 35 can be established experimentally in advance for a specific material 4. From the experimentally determined values for example a curve can be determined for the connection between the extension length and exerted braking force for a specific material with a predetermined puling force. In this way all of the standard methods known to a person skilled in the art of digital signal processing, such as interpolation, Kalman filtering, etc., can be used.

From the determined path of the curve the corresponding value or amount of force to be exerted by the braking device 3 can even be determined with continual deviations in position.

Alternatively or in addition to the above embodiment also mathematical models of the continuum mechanics for describing the extension behavior of a specific material to be embossed can be used for determining the necessary braking force.

Furthermore, the device 33 can be set up to check with reference to the image recognition unit 16 downstream of the embossing rollers 2, 3 whether the position of the embossed pattern 19 in relation to the imprint 18 corresponds to a reference position. The image recognition units 16, 33 can be in the form for example of suitably programmed micro- or signal processors and digital photo or video cameras connected therewith. An image of the imprint 18 or characteristic features of the imprint 18 can be stored in the internal memories of the image recognition units 16, 33. The image recognition units 16, 33 can be set up in this case to compare the saved characteristic features of the imprint 18 or an image of the imprint 18 with a recorded image or characteristic features of an imprint printed on the material 4 to be embossed. The image recognition unit 16 arranged downstream of the embossing rollers 2, 3 can also store an image or characteristic features of the embossed pattern 19 in a memory.

The image recognition itself can be performed for example by means of Optical Character Recognition "OCR". Furthermore, it should be mentioned at this point that the different components mentioned here can also be combined into a single component. The same applies in particular to the controls used, thus for example the image recognition units 16 and 33 can have a joint control which is connected to two cameras.

The control 39 connected to the braking device 35 can be set up to control the force exerted by the braking device 35 on the material 4 to be embossed as a function of the measurement result of the check of position of the image recognition unit 16 connected downstream of the embossing rollers 2, 3. In this way any deviation of the reference positions of the imprint 18 and embossed pattern 19 to one another can be corrected. The embodiment of the control described in this section can be combined with the above embodiment, which provides a control with reference to saved values in an advantageous manner. Thus the determined values can be used on the one hand as start values for the control and on the other hand also the additional use of the saved values prevents unreasonable values for the adjusting force being transmitted from the control 39 to the braking device 35 in error.

It should be noted at this point that instead of the aforementioned image recognition units 16 and 33 also other optical measuring devices 42 can be provided for detecting the positions of the imprints 18 and the pattern 19. Such an optical measuring device 42 could comprise for example a light source 43 and a light-sensitive sensor 44. The light source 43 can emit light in the visible, UV or infrared range for example. The light source 43 can also be in the form of a laser. By means of the sensor 44 for example the intensity of the light penetrating through the material 4 to be embossed and emitted by the light source 43 can be measured and by means of intensity fluctuations the positions of the imprint 18 or the pattern 19 on the material 4 can be determined. Of course, also any other method for determining the positions of the imprint 18 or pattern 19 is possible. Thus for example UV active color pigments can also be added to the imprint 18 which can be excited by UV light, wherein the position can be determined by detecting the UV light radiated by the imprint.

The advantages achieved by means of the device according to the invention can also be provided by the invention according to the invention for producing a tip cover for a cigarette tip. In the method according to the invention the material to be embossed is the tip cover material. This material can be, but need not be paper or plastic, as already mentioned above. The use of a material coated with a heat embossing foil, for example, has proved to be particularly suitable for the production and embossing of the tip cover, which is treated or heated prior to guiding through the embossing rollers 2, 3 by the radiation and/or heat source 32, for example radiation or convection heating. The heat embossing foil can also be melted by using a radiation source, for example a UV lamp, prior to embossing. By means of the method according to the invention with the image recognition unit 34 connected upstream of the embossing rollers 2, 3 the position of the imprint 18 applied onto the tip cover material to be embossed can be determined. If there is a deviation Δ1 of the imprint 18 from a reference position the braking device 35 is activated.

Figure 16:
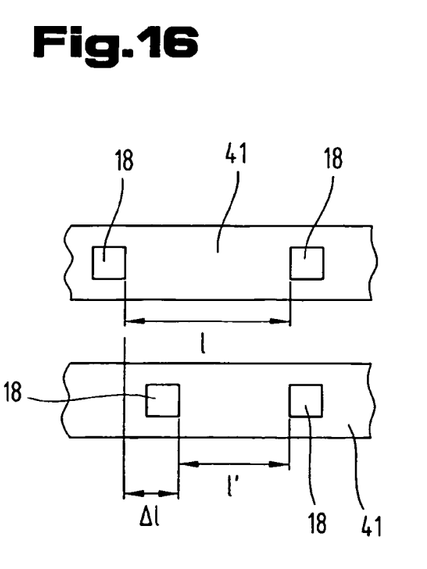
FIG. 16 shows a sketch of the principle for illustrating the method according to the invention and FIG. 17 shows a further sketch of the principle for illustrating the method according to the invention.

In the upper view of FIG. 16 a tip cover paper 41 is shown, on which the reference position is determined by the distance (1). If, as shown in the bottom view of the image recognition unit 34 in FIG. 16, a distance (1') is determined which is smaller than the reference distance (1) between the imprints 18, the braking device 35 can be activated so that the web of material 4 between the embossing rollers 2, 3 and the braking device 35 is stretched by the extent of the difference (Δ1). This has the effect that the embossing of the pattern 19 by means of the embossing rollers 2, 3 can be performed in exact alignment with the imprint 18. Thus it is possible for example to emboss the pattern 19 even with irregular distances (1') in exact alignment with the imprint 18, for example exactly on the latter.

Also in connection with the method according to the invention with regard to determining the positions of the imprints 18 and the embossed patterns 19 the above applies in connection with the device 33. Thus the positions of the imprints 18 and the pattern 19 or the corresponding distances can be determined by any other optical measuring method suitable therefor. The described measuring methods, in particular the use of image recognition units 16 and 33, are only given by way of example and the concept of the invention is not restricted to a specific measuring method.

Figure 17:
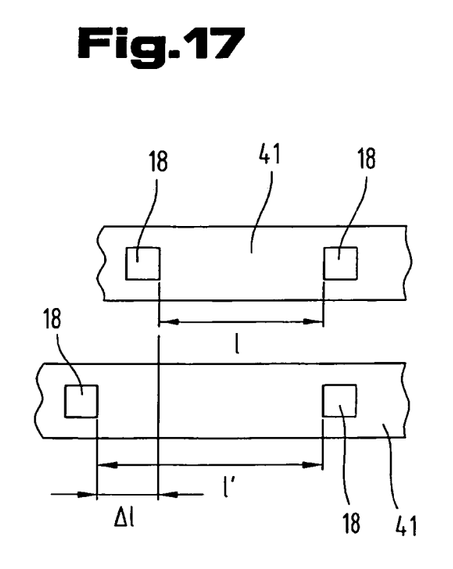

In order to be able to correct any deviation from the reference position, in which 1'>1, as shown in FIG. 17, and which can thus not be corrected by an extension of the tip cover material 41, the tip cover material 41 can be pretensioned in longitudinal direction by means of the braking device 35.

By reducing the clamping force exerted by the braking device 35 on the tip cover material 41 the extension of the pretensioned tip cover material 41 can be reduced by the amount (Δ1).

Alternatively to the pretensioning by means of the braking device 35 the tip cover material could also be pretensioned by the braking device of the winding device if it is provided as a wound roll. By reducing the braking force on the winding device the extension of the pretensioned tip cover material 41 can be reduced by the amount Δ1.

Thus by means of the method according to the invention any kind of deviation of the imprint 18 from its reference position can be compensated in longitudinal direction of the tip cover material 41.

The extension of the tip cover paper can be controlled and/or implemented by a control, as described above in connection with the device 33.

Lastly, it should be noted that the exemplary embodiments only show possible embodiment variants of the solution according to the invention, wherein the invention is not restricted to the embodiment variants shown in particular. In particular also combinations of the individual embodiment variants are possible and this variability, due to the teaching on technical procedure of the present invention, lies within the ability of a person skilled in the art in this technical field. Thus all conceivable embodiment variants, which implement the concept on which the invention is based and which are not described or represented specifically or are possible by combining individual details of the shown and described embodiment variants are also covered by the scope of the invention. The protection also extends to the individual components of the device according to the invention, provided that latter are essential to the implementation of the invention.

| List of Reference Numerals | |
| --- | --- |
| 1 | embossing device |
| 2 | embossing roller |
| 3 | embossing roller |
| 4 | band-like material |
| 5 | first embossing track |
| 6 | second embossing track |
| 7 | synchronization means of the first embossing track |

-continued

List of Reference Numerals

| | |
|---|---|
| 8 | synchronization means of the second embossing track |
| 9 | surface section of an embossing roller |
| 10 | surface section of an embossing roller |
| 11 | tooth |
| 12 | row of teeth or synchronization means |
| 13 | row of teeth or synchronization means |
| 14 | embossing/perforation structure |
| 15 | single-track embossing roller |
| 16 | image recognition unit |
| 17 | printing device |
| 18 | imprint |
| 19 | embossed logo |
| 20 | embossing station |
| 21 | control |
| 22 | first motor |
| 23 | second motor |
| 24 | first sensor |
| 25 | second sensor |
| 26 | control |
| 27 | electric motor |
| 28 | first drive shaft |
| 29 | second drive shaft |
| 30 | shaft |
| 31 | force coupling member |
| 32 | radiation and/or heat source |
| 33 | device for embossing |
| 34 | image recognition unit |
| 35 | braking device |
| 36 | braking roller |
| 37 | braking roller |
| 38 | wrapping roller |
| 39 | control |
| 40 | memory |
| 41 | tip cover material |
| 42 | optical measuring device |
| 43 | light source |
| 44 | sensor |
| 45 | embossing roller |
| 46 | drive roller |
| 47 | synchronization means |
| 48 | embossing track |
| 49 | embossing track |
| 50 | embossing track |
| 51 | embossing station |

The invention claimed is:

1. A device for embossing a predeterminable pattern onto at least one flat material introduced between at least two embossing rollers of the device, the movements of the at least two embossing rollers being synchronized with one another and the at least two embossing rollers also each having at least two embossing tracks,
   wherein the movements of the at least two embossing rollers are synchronized by synchronization devices,
   wherein the synchronization devices engage with one another, are distributed over casing surfaces of the at least two embossing rollers, and are allocated to different embossing tracks, the various embossing tracks of the associated synchronization devices of the same embossing roller being offset in relation to one another,
   wherein the synchronization devices constitute embossing structures,
   wherein each embossing structure constituted by the synchronization devices of a first embossing roller of the at least two embossing rollers is formed by raised points constituting an individual logo to be embossed onto the flat material,
   wherein a plurality of individual logos are arranged on the first embossing roller, and
   wherein the synchronization devices of the first embossing roller are arranged on the surface of the first embossing roller only in areas of the individual logos.

2. The device as claimed in claim 1, wherein the casing surfaces of the at least two embossing rollers are designed to be congruent with one another in the region of the synchronization devices and the raised points of at least one first radially circumferential surface section of the first embossing roller are arranged to be offset relative to the raised points of at least one second surface section of the first embossing roller.

3. The device as claimed in claim 2, wherein the raised points of the first surface section and the second surface section are arranged in rows,
   wherein rows of the first surface section are offset relative to the rows of the second surface section, and
   wherein a row of the second surface section ends up in the line of vision of a direction parallel to the longitudinal axis of the first embossing roller between two rows of the first surface section.

4. The device as claimed in claim 2, wherein the raised point are in form of teeth.

5. The device as claimed in claim 4, wherein the teeth are in the form of truncated pyramids.

6. The device as claimed in claim 1, wherein the synchronization devices of the first embossing roller are designed to be similar.

7. The device as claimed in claim 1, wherein the synchronization devices are arranged on the surfaces of the at least two embossing rollers in parallel rows.

8. The device as claimed in claim 1, wherein a second embossing roller of the at least two embossing rollers is provided with a counter printing surface on a point corresponding to an embossing structure of the embossing structures of the first embossing roller.

9. The device as claimed in claim 8, wherein the embossing structures of the first embossing roller are arranged offset to one another laterally and in the radial circumferential direction of the at least two embossing rollers.

10. The device as claimed in claim 8, wherein the embossing structure of the first embossing roller is applied onto a suitable, smoothed surface layer of the second embossing roller.

11. The device as claimed in claim 1, wherein the at least two embossing rollers can be pressed against one another flexibly.

12. The device as claimed in claim 1, wherein the device comprises sensors for detecting the relative position of the at least two embossing rollers to one another.

13. The device as claimed in claim 12 wherein the sensors are configured as rotary angle sensors.

14. The device as claimed in claim 1, wherein the first embossing roller can be driven by a motor and a second embossing roller of the at least two embossing rollers can be driven by the synchronization devices arranged on the casing surfaces and engaging with one another.

15. the device as claimed in claim 1, wherein each embossing roller of the at least two embossing rollers is driven by its own motor.

16. The device as claimed in claim 15, wherein the device comprises control connected to sensors and the motors of the at least two embossing rollers, and
   wherein the control is set up to change the speed of the at least two embossing rollers to compensate for a difference between a reference relative position and a measured relative position with reference to data sent thereto by the sensors.

17. The device as claimed in claim 1, wherein the device comprises an electric motor, the electric motor at this same time driving a first drive shaft for the first embossing roller and driving second drive shaft for a second embossing roller of the at least two embossing rollers at the same speed, the first embossing roller and the second embossing roller being arranged parallel to one another.

18. The device as claimed in claim 17, wherein the first embossing roller is driven directly by the first drive shaft, and wherein the second drive shaft via at least one force coupling member drives a further shaft parallel to the first drive shaft, the second embossing roller being arranged on the further shaft.

19. The device as claimed in claim 18, wherein the first drive shaft and the second drive shaft are configured to be in one piece with one another.

20. The device as claimed in claim 1, wherein the device comprises a radiation source and/or a heat source acting on the material to be embossing.

21. The device as claimed in claim 1, wherein the device comprises an optical measuring device connected downstream of the at least two embossing rollers for determining the position of a pattern produced by the embossing structures on the material to be embossed.

22. The device as claimed in claim 21, wherein the optical measuring device is an image recognition unit.

23. The device as claimed in claim 21, wherein the device is set up to compensate a deviation between a determined position and a reference position of the pattern produced.

24. The device as claimed in claim 1, wherein the device is set up to determine prior to the embossing of the material the distance between at least two consecutive imprints on the material to be embossed, and in the case of a deviation of this distance from a reference distance to change the longitudinal extension of the material according to the determined deviation.

25. The device as claimed in claim 24, wherein the device comprises at least one optical measuring device connected upstream of the at least two embossing rollers for detecting the position of at least one imprint applied onto the material to be embossed and at least one braking device connected upstream of the at least two embossing rollers and acting on the material to he embossed for changing the longitudinal tension of the material to be embossed, wherein at least one control is provided which is set up to activate the braking device in the case of a deviation of the imprint from a reference position, so that the longitudinal tension of the material to be embossed is changed according to a force exerted by the braking device on the material to be embossed, and wherein the force exerted by the braking device on the material to he embossed is dependent on the determined deviation.

26. The device as claimed in claim 25, wherein the optical measuring device is an image recognition unit.

27. The device as claimed in claim 26, wherein the image recognition device is set up to compare saved characteristic features of the imprint or an image of the imprint with an image or characteristic features of an imprint to be printed on the material to be embossed.

28. The device as claimed in claim 25, wherein the braking device comprises at least two braking rollers, between which the material to be embossed is guided.

29. The device as claimed in claim 28, wherein the surface pressure of the at least two braking rollers can be adjusted.

30. The as claimed in claim 25, wherein the control is set up to determine a distance between at least two consecutive imprints applied onto the material to be embossed and to check whether this distance corresponds with a reference distance.

31. The device as claimed in claim 30, wherein the control is also set up to transmit to the at least one braking device a valve of the force required to compensate the deviation and to he exerted on the material to be embossed or signal proportional to this value in case of a deviation of the reference distance from the determined distance.

32. The device as claimed in claim 25, wherein the device is set up to check with reference to a second optical measuring device arranged downstream of the at least two embossing rollers, whether a position of at least one embossed pattern relative to the at least one imprint corresponds to a reference position, and wherein the control connected to the braking device set up to control the force exerted by the braking device on the material to be embossed as a function of the measurement result of the position check of the optical measuring device connected downstream of the least two embossing rollers, in order to compensate for any deviation of the reference position of the imprint and embossed pattern from one another.

33. The device as claimed in claim 1, wherein the raised points of the first embossing roller are arranged on at least one first radially circumferential surface section and at least one second radially circumferential surface section, and wherein the raised points of the at least one first radially circumferential surface section and the at least one second radially circumferential surface section of the first embossing roller are arranged to bs offset to one another laterally and in radial circumferential direction.

34. A method for embossing a tip cover material for a cigarette tip, providing a device for embossing a predeterminable pattern onto at least one flat material introduced between at least two embossing rollers of the device, the movements of the at least two embossing rollers being synchronized with one another and the at least two embossing rollers also each having at least two embossing tracks, wherein the movements of the at least two embossing rollers are synchronized by synchronization devices, wherein the synchronization devices engage with one another, are distributed over casing surfaces of the at least two embossing rollers, and are allocated to different embossing tracks, the various embossing tracks of the associated synchronization devices of the same embossing roller being offset in relation to one another, and using the device to emboss the tip cover material, wherein the synchronization devices constitute embossing structures, wherein each embossing structure constituted by the synchronization devices of a first embossing roller of the at least two embossing rollers is formed by raised points constituting an individual logo to be embossed onto the flat material, wherein a plurality of individual logos are arranged on the first embossing roller, and wherein the synchronization devices of the first embossing roller are arranged on the surface of the first embossing roller only in areas of the individual logos.

35. Method according to claim 34, wherein paper is used as the tip cover material.

36. The method as claimed in claim 35 wherein a foil is used as the tip over material.

37. The method as claimed in claim 36, wherein the foil or the material coated with a heat embossing foil is heated prior to embossing.

38. The method as claimed in claim 34, wherein prior to embossing the material the distance between at least two consecutive imprints on the material to be embossed is determined and if there is a deviation of this distance from a reference distance the longitudinal extension of the material is changed according to the determined deviation.

39. The method as claimed in claim 38, wherein via at least one optical measuring device arranged upstream of the at least two embossing rollers the position of at least one imprint applied onto the tip cover material to be embossed is determined and via at least one braking device connected upstream of the at least two embossing rollers and acting on the tip cover material to be embossed the longitudinal tension of the tip cover material to be embossed is changed,
wherein at least one control is provided, which when there is a deviation of the imprint from a reference position activates the braking device, so that the longitudinal tension of the tip cover material to be embossed is changed according to a force exerted by the braking device on the tip cover material, and
wherein the force exerted by the braking device on the tip cover material to be embossed is dependent on the determined deviation.

40. The method as claimed in claim 39, wherein an image recognition unit is used as the optical measuring device and saved characteristic features of the imprint or a saved image of the imprint are compared with a recorded image or characteristic features of an imprint printed on the tip cover material to be embossed.

41. The method as claimed in claim 39, wherein via the control the distance between at least two imprints applied consecutively onto the tip cover material to be embossed is determined and it is checked to see whether this distance corresponds with a reference distance.

42. The method as claimed in claim 41, wherein if there is a deviation between the reference distance and the determined distance the force required to compensate for this deviation and to be exerted by the braking device on the tip cover material to be embossed is adjusted by the control.

43. The method as claimed in claim 38 wherein the tip cover material to be embossed is pretensioned.

* * * * *

UNITED STATES PATENT AND TRADEMARK OFFICE
CERTIFICATE OF CORRECTION

| | | |
|---|---|---|
| PATENT NO. | : 9,492,966 B2 | Page 1 of 1 |
| APPLICATION NO. | : 13/510082 | |
| DATED | : November 15, 2016 | |
| INVENTOR(S) | : Griesmayr | |

It is certified that error appears in the above-identified patent and that said Letters Patent is hereby corrected as shown below:

In the Claims

In Column 16, Line 15 (Line 4 of Claim 3) after "wherein" please insert the word: --the--.

In Column 16, Line 61 (Line 2 of Claim 16) after "comprises" please insert the word: --a--.

In Column 17, Line 21 (Line 3 of Claim 20) please change "embossing" to correctly read: --embossed--.

In Column 17, Line 45 (Line 7 of Claim 25) please change "he" to correctly read: --be--.

In Column 18, Line 9 (Line 4 of Claim 31) please change "he" to correctly read: --be--.

In Column 18, Line 9 (Line 4 of Claim 31) after "or" please insert the word: --a--.

Signed and Sealed this
Seventeenth Day of January, 2017

Michelle K. Lee
*Director of the United States Patent and Trademark Office*